Jan. 21, 1958 D. B. MILLAT ET AL 2,820,503
HUB CAP LOCK
Filed May 21, 1956
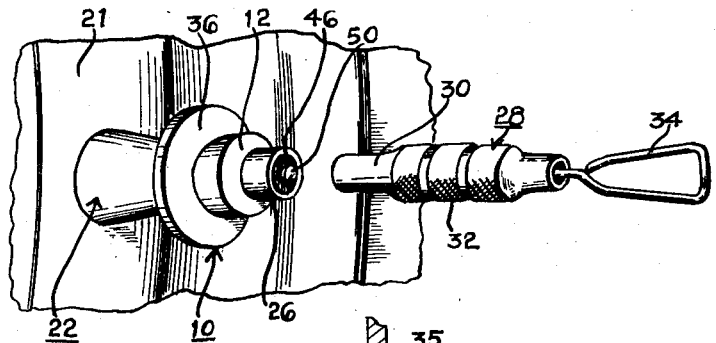
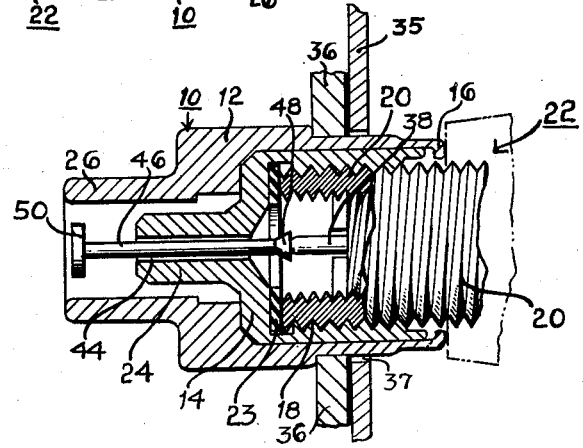
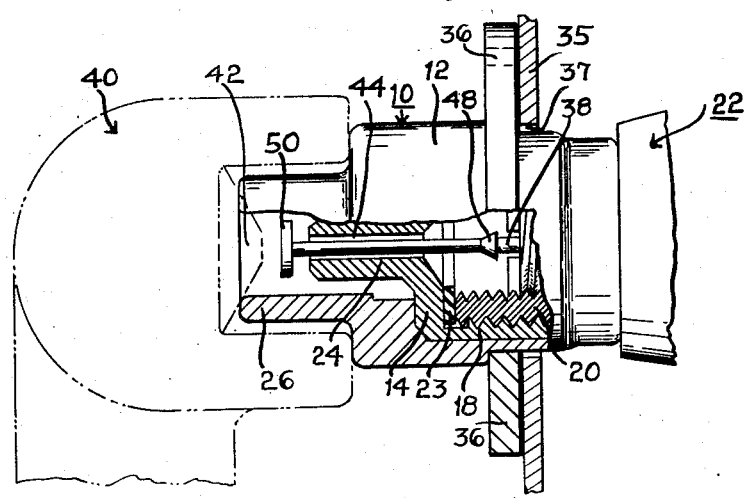
INVENTOR.
DAVID B. MILLAT
AND ALFRED E. MILLAT
BY
HIS ATTORNEYS

United States Patent Office 2,820,503
Patented Jan. 21, 1958

2,820,503

HUB CAP LOCK

David B. Millat and Alfred E. Millat, Dayton, Ohio

Application May 21, 1956, Serial No. 586,148

4 Claims. (Cl. 152—431)

This invention relates to an improved hub cap lock of the type adapted to engage the valve stem of an automobile tire assembly, and more particularly to a hub cap lock so constructed and arranged that inflation of the tire assembly is permitted without removal of the hub cap lock.

The hub cap lock to which this improvement relates comprises two concentric independently rotatable members, an inner member adapted to threadedly engage a valve stem and an outer member provided with an annular flange portion adapted to retain a hub cap. In presently available locks of this type, the inner member serves as a dust cap for the valve stem assembly and, for this reason, it is impossible to inflate or deflate the tire assembly without removing the hub cap lock.

An object of the present invention is to provide an improved hub cap lock for attachment to a valve stem, said lock including a valve actuator pin whereby the valve located in the valve stem may be actuated for inflation or deflation of the tire.

Other objects and advantages reside in the construction of parts, the combination thereof and the mode of operation, as will become more apparent from the following description.

In the drawing, Figure 1 is a fragmentary perspective view of an automobile wheel with the hub cap removed, showing the hub cap lock in engagement with a valve stem. The figure also shows a suitable key member for operating the lock.

Figure 2 is an elevation view, in section, of the hub cap lock in engageemnt with a hub cap, shown in fragmentary section view, and a valve stem, shown in phantom.

Figure 3 is an elevational view, with parts broken away, of the hub cap lock in engagement with a tire inflation nozzle, shown in phantom.

Referring to the drawing in detail, the hub cap lock disclosed herein is designated by the reference numeral 10. The hub cap lock has a housing portion 12 provided with an internal cavity within which is located a cylindrical valve stem capping member 14. The lower end of the housing 12 is provided with an annular inwardly extending collar 16, which loosely retains the capping member 14 within the internal cavity of the housing member 12. The capping member 14 is thereby free to rotate within the housing 12.

The capping member 14 is provided with an internal threaded portion 18 adapted to threadedly engage the end portion 20 of a conventional valve stem 22 which, as illustrated in Figure 1, projects from the rim 21 of an automobile wheel. A resilient washer 23 disposed in the base of the threaded portion 18 provides an air seal between the end portion 20 of the valve stem and the capping member 14. The end of the capping member 14, opposite the threaded portion 18, is provided with a stud 24 which may have any of a wide variety of cross-sectional shapes.

The stud 24 projects into a substantially tubular end portion 26 of the housing 12, but does not project out of the housing 12. The stud 24 and end portion 26 thus cooperate to provide a key receiving annular slot. By this arrangement, the stud 24 is ordinarily inaccessible and cannot be rotated except with special tools. A wrench or key 28 suitable for this purpose is shown in Figure 1.

The key 28 is substantially cylindrical in shape having an end portion 30 of reduced diameter adapted to fit into the tubular end portion 26 of the housing 12. The key 28 is provided with an internal cavity (not shown) in the end portion 30 thereof, said cavity having a shape complementing that of the stud 24, whereby the key 28 may be used to engage and rotate the stud. As an illustration, the stud 24 may be of hexagonal cross-sectional shape with the key 28 having an internal cavity of hexagonal cross-section.

The cylindrical body portion of the key 28 is knurled at 32 to facilitate manual rotation thereof. Rotatably mounted in the end of the key 28, opposite the end portion 30, is a ringlet 34 whereby the key 28 may be attached to a key ring, or the like, and rotated independently thereof.

With the stud and key arrangement herein described, the capping member 14 can be attached to, and detached from, a valve stem only through the use of the particular key 28, complementing the stud 24. No amount of rotation of the housing 12 will disengage the capping member 14 from the valve stem.

The majority of modern automobiles are provided with hub caps which extend substantially the diameter of the rim of the wheel, the hub cap as shown schematically at 35 in Figures 2 and 3 having a suitable aperture 37 therein through which projects the valve stem. With such an arrangement, it is possible to introduce air into the tire without removing the hub cap.

To prevent theft of the hub cap, the hub cap lock 10 of this invention is provided with an annular, outwardly projecting flange portion 36 secured to the housing 12. The flange portion 36 may be integral with the housing 12, or, as shown in the drawing, may be welded or press fitted to the housing 12.

The diameter of the flange portion 36 is greater than that of the aperture 37 ordinarily provided in the hub cap 35 for the purpose of receiving the valve stem. Thus, when the hub cap lock 10 is threadedly attached to the valve stem, the flange 36 makes it impossible to remove the hub cap 35 from the wheel without first removing the hub cap lock.

The hub cap lock 10, with its complementary key 28, thus provides protection from vandalism and petty thievery directed toward both the hub cap and wheel itself, since it is not possible to remove the wheel of an automobile without first removing the hub cap.

Conventional valve stems such as that shown at 22 are provided with a central reciprocally mounted valve pin 38 which must be depressed manually before air can be released from the tire. Similarly conventional tire inflation nozzles, such as that shown schematically at 40 in Figure 3, are provided with a centrally located pin 42 adapted to engage the end portion of the valve stem whereby the pin 42 is depressed to release air from the nozzle.

In the present invention, inflation and deflation of the tire, through the hub cap lock 10, is provided for in the following. Extending axially through the stud 24 of the capping member 14 is an aperture 44 communicating with the threaded end portion 20 of the valve stem 22. Journalled loosely in the aperture 44 is an actuator pin 46, the pin 46 having a diameter less than that of the aperture 44, so as not to obstruct the passage of air therethrough.

A conical end portion 48 of the actuator pin 46 located within the capping member 14 is adapted to engage the valve pin 38. At the opposite end of the actuator pin 46 is a circular head portion 50 which may be depressed manually to actuate the valve pin 38 so as to deflate the tire. When, as is illustrated in Figure 3, a tire inflation nozzle 40 is seated upon the tubular end portion 26 of the housing 12, a pin 42 in the nozzle 40 engaging the end portion 26 releases air from the nozzle, the air pressure being sufficient to actuate the valve of the valve stem so as to inflate the tire.

The resilient washer 23 providing a gasket between the capping member 14 and the valve stem 22 prevents leakage of air therebetween allowing for efficient tire inflation through the hub cap lock.

It is not intended to limit the present invention to the particular shape of actuator pin described herein. For reasons of economy, the actuator pin 46 is in reality a conventional tubular rivet, one end of which is flared outwardly to a conical shape in the assembly of the hub cap lock. It is to be understood that the actuator pin may be fabricated in other ways, however, and may therefore have other shapes.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. A device for preventing the theft and tampering of parts of a motor vehicle, said device including the combination of a hub cap having an aperture therein, a threaded valve stem provided with a valve pin, said valve stem projecting through said aperture, a hub cap lock comprising a substantially cylindrical housing having an internal cavity, said housing having an annular flange projecting therefrom, the diameter of the flange being greater than the diameter of the aperture in the hub cap to thereby prevent removal of the hub cap without removing the hub cap lock, a capping member rotatably retained within said housing, said capping member threadedly engaging the threaded valve stem and overlying the end thereof, a key engaging stud projecting from one end of said capping member, said housing having a tubular end portion encircling said stud and cooperating therewith to provide a key receiving slot, said stud having an aperture therein providing an air passage communicating with said valve stem, valve actuator means disposed in the aperture in said stud and engaging said valve pin providing for manual actuation of said valve pin, the tubular end portion of said housing providing a nozzle engaging portion for engaging a tire inflation nozzle, and a key member having an end portion adapted to slidably fit within said key receiving slot to engage said key engaging stud.

2. The combination with a valve stem for an automobile tire assembly, said valve stem having a nozzle engaging portion including a threaded tubular end portion, and a valve pin coaxial therewith, of a hub cap lock including a cylindrical housing provided with an annular flange portion adapted to retain a hub cap, said housing having an internal cavity, a capping member rotatably retained in the cavity of said housing, said capping member being adapted to threadedly engage the tubular end portion of said valve stem, a key engaging stud integral with said capping member and projecting therefrom, said housing having a tubular end portion encircling said stud and cooperating therewith to provide a key receiving slot, the tubular end portion of said housing having a diameter substantially equal to that of the end portion of said valve stem, said stud having an axially extending aperture therein, valve actuating means for deflating the tire of said tire assembly associated with said stud and engaging said valve pin, the tubular end portion of said housing providing a nozzle engaging portion operative in lieu of the nozzle engaging portion of said valve stem.

3. The combination according to claim 2, wherein the valve actuating means includes a substantially cylindrical actuator pin journalled loosely in the aperture of said stud, said actuator pin having one end adapted to engage said valve pin, the other end being adapted for manual actuation to deflate the tire of said tire assembly.

4. In a hub cap lock for attachment to the valve stem of an automobile tire assembly, said hub cap lock including a hollow substantially cylindrical housing provided with an annular flange portion adapted to retain a hub cap, and a capping member rotatably retained within said housing adapted to threadedly engage said valve stem, said capping member having an end portion overlying the end of the valve stem, said end portion having a key engaging stud projecting therefrom, said housing having a tubular end portion encircling said stud and cooperating therewith to provide a key receiving slot, valve actuator means reciprocally mounted in said capping member for engaging and depressing the valve pin of said valve stem, the tubular end portion of said housing providing a nozzle engaging portion adapted to engage a tire inflation nozzle.

References Cited in the file of this patent
UNITED STATES PATENTS

| | | |
|---|---|---|
| 641,191 | Champion | Jan. 9, 1900 |
| 2,043,380 | Kirkpatrick | June 9, 1936 |
| 2,747,940 | Tracy | May 29, 1956 |